United States Patent [19]
Rawlings et al.

[11] Patent Number: 5,874,167
[45] Date of Patent: Feb. 23, 1999

[54] HIGH EFFICIENCY METAL PIGMENTS

[75] Inventors: Diane C. Rawlings, Bellevue; Micheal E. Dickson, Federal Way; Philip M. Lemoine, Seattle; Kevin R. Malone, Tacoma, all of Wash.

[73] Assignee: The Boeing Company, Seattle, Wash.

[21] Appl. No.: 770,606

[22] Filed: Dec. 19, 1996

[51] Int. Cl.⁶ .................................. B32B 5/16; C23C 8/00
[52] U.S. Cl. ........................... 428/402; 428/403; 148/240
[58] Field of Search .................................... 428/402, 403; 148/240

[56] References Cited

U.S. PATENT DOCUMENTS

| | | | |
|---|---|---|---|
| 4,863,516 | 9/1989 | Mosser et al. | 106/14.12 |
| 4,879,140 | 11/1989 | Gray et al. | 427/38 |
| 5,100,599 | 3/1992 | Gurnick et al. | 264/81 |
| 5,261,955 | 11/1993 | Nadkarni | 106/404 |
| 5,322,560 | 6/1994 | DePue et al. | 106/404 |
| 5,372,638 | 12/1994 | DePue et al. | 106/404 |
| 5,480,481 | 1/1996 | Setoguchi et al. | 106/404 |

*Primary Examiner*—Ardin H. Marschel
*Assistant Examiner*—Jezia Riley
*Attorney, Agent, or Firm*—John C. Hammar

[57] ABSTRACT

Thin film metal particulates are removed from FEP sheetstock cheaply and quickly by immersing the coated FEP first in a base and then in an acid. Occasionally, ultrasonic vibration of the FEP may also be required. The particulates are useful as paint pigments when isolated and conversion coated. The FEP is reusable.

20 Claims, No Drawings ic coatings.

HIGH EFFICIENCY METAL PIGMENTS

TECHNICAL FIELD

The present invention relates to a method for making thin film metal pigments for aerospace coatings.

BACKGROUND OF THE INVENTION

Thin film metal particulates are expensive, because existing process to make them, like those described in U.S. Pat. Nos. 4,879,140 or 5,100,599, use exotic equipment such as plasma generators or vacuum chambers, or are labor intensive, small scale processes like photolithography. The prior art particulates are not readily produced in reasonable volume, and cost as much as $5,000/oz. At these prices, paints that use the particulates as the pigment are only suitable for highly specialized applications. There is a need for a lower cost, higher volume process for rapidly and reliably making thin film metal particulates usable as paint pigments.

SUMMARY OF THE INVENTION

The present invention is an inexpensive method to rapidly manufacture thin film metal particulates usable as paint pigments. The method involves immersing a metallized sheet of fluorinated ethylene propylene (FEP) first in an aqueous base and then in an aqueous acid to loosen and release the metal from the FEP. The particulates are brushed from the FEP into the acid tank, and are recovered. The FEP is reusable. The particulates are usually aluminum or germanium metal having a thickness of about 900 to 1100 Å, and preferably, 1000 Å.

The method may also include ultrasonically vibrating the metallized sheet following the immersions.

For making aluminum particulates, the preferred base is 7% $Na_2CO_3$ and the preferred acid is 0.01–0.1 N acetic acid. For making germanium particulates, the preferred base is 2.5 N NaOH, since this metal is harder to loosen from the FEP. The acid bath neutralizes the basic reaction between the metal film and base.

DETAILED DESCRIPTION OF THE INVENTION

The present invention is a low cost, reasonably high volume method for making thin film aluminum or germanium particulates. The particulates are useful as pigments in paint, but their current costs of as much as $5,000/oz. restricts their adoption. Preferred particulates are essentially price metals (with suitable surface conversion coatings) having a thickness of about 1000 Å±5–10%. The particulates otherwise should meet the conventional specifications for paint pigments. In that regard the particulates (also sometimes called flakes) must be thick enough to provide opacity while producing minimum edge effects (scattering). A characteristic dimension, then, for either the length or width would be 20–100 $\mu$m, and, preferably, 30–50 $\mu$m. We target, then, particulates of characteristic nominal dimensions of 50 $\mu$m×50 $\mu$m×1000 Å.

We have discovered that films of the desired thickness can be prepared by sputtering the metal onto two mil thick fluorinated ethylene propylene (FEP) sheetstock. Making this film product is done according to the conventional processing steps for making food or vacuum bagging materials. The method of the present invention removes the metal from the metallized film in two, simple and quick immersion steps. First, the metallized roll is immersed in a caustic (basic) bath for about 15 sec to loosen the metal. Then, we immerse the roll again for about 15 sec in a dilute acid solution to neutralize the base and to separate the metal. We brush the particulates from the FEP, and precipitate the particulates in the acid solution prior to filtering, rinsing, and drying.

To separate the metal from the FEP we generally contact the metal with one or more counter rotating cylindrical nylon bristle brushes. We sometimes use ultrasonic vibration alone or in combination with the brushing. For aluminum thin films, we prefer to use 7 wt %. $Na_2CO_3$ as the base, but can use $NaHCO_3$, $NaCO_3/NaHCO_3$ mixtures, or conventional alkaline or alkaline earth hydroxides diluted to about a pH of 9.0. The acid solution preferably is 0.01–0.1 N acetic acid at pH 3.4–3.6, but could be phosphoric acid or a dilute mineral acid.

For germanium thin films, we prefer to use 2.5 N NaOH as the base with acetic acid or with ultrasonic vibration replacing the acid solution.

For brushes, we prefer 3 inch nylon bristle (0.010) diameter) spiral wound brushes available from Richards Brush Company.

The base immersion takes about 15 seconds. Prior to the acid immersion, we allow the base-treated metallized film to be exposed to air for about 25 seconds. The acid immersion lasts about 15 seconds before we brush the particulates from the FEP. We tow the metallized roll through the several operations in a continuous process, as will be understood by those of ordinary skill.

We monitor the pH of the acid tank with conventional pH or ORP meters and add acid as necessary to maintain the desired pH and redox potential.

We recover the particulates from the acid bath by filtering, rinsing, and drying. We size the particulates. Then, we conversion coat the particulates using convention aluminum treatments like chromic acid anodizing, phosphoric acid anodizing, alodyne treating (particularly using either alodyne 600 or alodyne 1200); cobalt-based conversion coating as described in Boeing's U.S. Pat. No. 5,298,092; 5,378,293; 5,411,606; 5,415,687; 5,468,307; 5,472,524; 5,487,949; and 5,551,994; or sol coating. The sol coating method creates a sol-gel film on the surface using a hybrid organozirconium and organosilane sol as described in Boeing's U.S. patent application Ser. No. 08/1742,168 "Sol Coating of Metals." We incorporate by reference these Boeing patents and patent application.

The different treatments can impart different tint to the pigment. Alodyne imparts a yellow or greenish-yellow tint. The cobalt treatments impart blue tints.

The sol coating is preferable a hybrid mixture wherein the zirconium bonds to the aluminum flake covalently while the organic tail of the organosilane bonds with the paint binder. the surface to achieve adhesion primarily by mechanical surface phenomena. the sol coating provides both mechanical adhesion (surface microroughening) and adhesion through chemical affinity, compatibility, and covalent chemical bonds.

The pigments typically are used in urethane, cyanate ester, or urea binders, so the organosilane in the sol coating generally will include a lower aliphatic amine.

While we have described preferred embodiments, those skilled in the art will readily recognize alterations, variations, and modfications which might be made without departing from the inventive concept. Therefore, interpret the claims liberally with the support of the full range of equivalent known to those of ordinary skill based upon this description. The examples illustrate the invention and are not intended to limit it. Accordingly, define the invention with the claims and limit the claims only as necessary in view of the pertinent prior art.

We claim:

1. A method for making metal pigments, comprising the steps of:
   (a) depositing metal onto a sheet of fluorinated ethylene propylene (FEP) sheetstock to form a thin film;
   (b) immersing the coated FEP in a base to loosen the thin film from the FEP;
   (c) immersing the loosened thin film on the FEP in an acid to neutralize the base and to remove the thin film metal in particulate form;
   (d) isolating the particulates; and
   (e) applying conversion coatings to the particulates to produce metal pigments.

2. The method of claim 1 wherein the metal is aluminum and the acid is acetic acid at a concentration of about 0.01–0.1N.

3. The method of claim 2 wherein the metal is aluminum and the base is sodium carbonate.

4. The method of claim 1 wherein the metal is germanium, the base is sodium hydroxide, and the acid is 0.01–0.1N acetic acid.

5. The method of claim 1 further comprising the step of exposing the thin film after the acid immersion to ultrasonic vibration in a water bath.

6. The method of claim 3 wherein the base immersion occurs for about 15 seconds and the acid immersion occurs about 25 seconds later after exposure to air.

7. The method of claim 1 wherein the metal is aluminum and the base is an aqueous solution of $Na_2CO_3$, $NaHCO_3$, or mixtures thereof.

8. The method of claim 7 wherein the acid is an aqueous solution of acetic acid, phosphoric acid, or mixtures thereof at a pH of about 3.4–3.6.

9. The method of claim 1 further comprising the step of recycling the FEP sheetstock for depositing additional metal.

10. The method of claim 1 wherein the metal is about 1000±100 Å thick.

11. Pigments obtainable by the method of claim 8.

12. Pigments obtainable by the method of claim 1.

13. The method of claim 1 wherein conversion coating involves chromic acid anodizing, phosphoric acid anodizing, cobalt-based conversion coating, alodyne coating, or sol coating of the particulates.

14. The pigment obtainable by the method of claim 13.

15. A metal pigment for an aerospace coating, comprising:
   a metal flake approximately 1000±100 Å thick coated with a conversion coating selected from the group consisting of a chromic acid anodizing conversion coating, a phosphoric acid anodizing conversion coating, a cobalt-based conversion coating, an alodyne coating, or a sol-gel coating, the flakes having nominal dimensions of 20–100 $\mu$m×20–100 $\mu$m in length and width.

16. The pigment of claim 15 wherein the metal is aluminum.

17. The pigments of claim 15 wherein the nominal dimensions of the flakes are about 30–50 $\mu$m by 30–50 $\mu$m in length and width.

18. The pigment of claim 15 wherein the conversion coating is a chromic acid anodizing conversion coating.

19. The pigment of claim 15 wherein the flakes are coated with alodyne.

20. The pigment of claim 15 wherein the flakes are coated with a sol-gel coating, the sol-gel coating containing an organozirconium and an organosilane.

* * * * *